D. B. WILLIAMS.
SEGREGATING FEEDER FOR NUT CRACKING MACHINES.
APPLICATION FILED OCT. 19, 1914.
1,187,878.
Patented June 20, 1916.
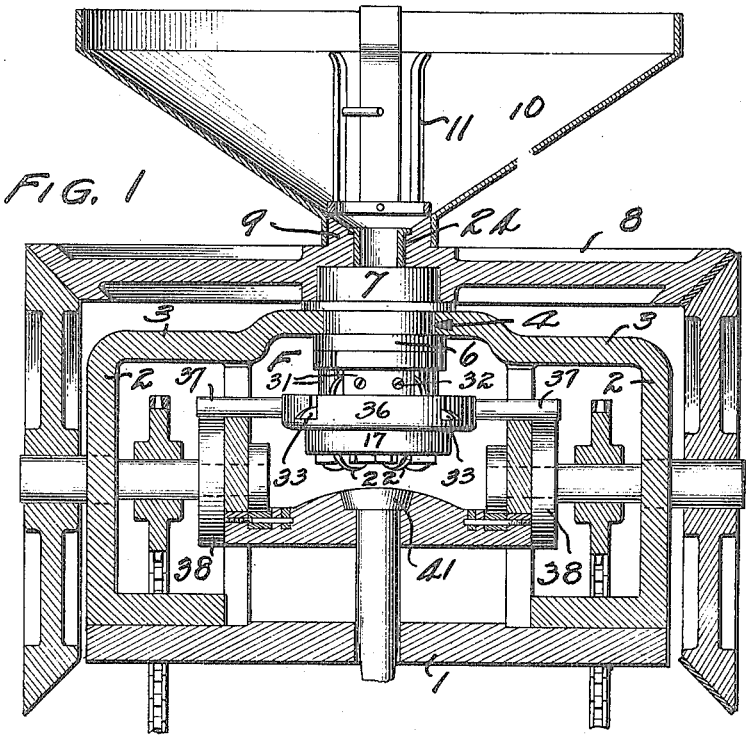
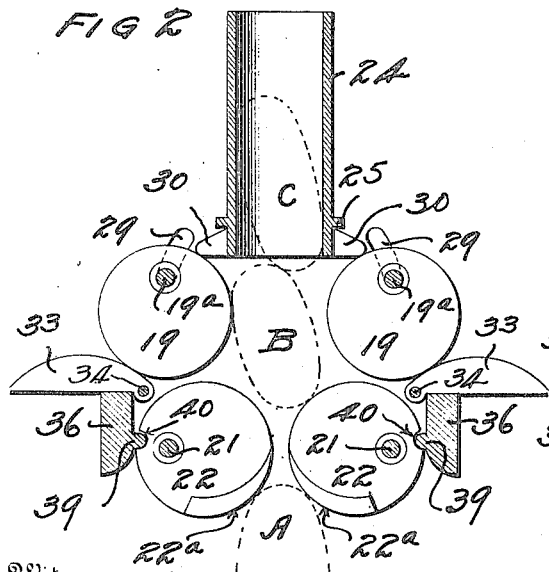
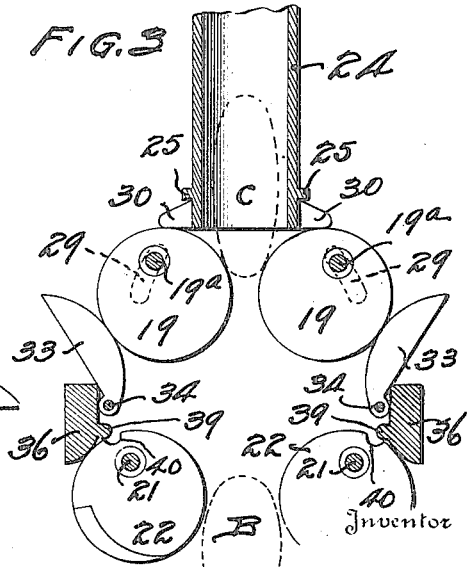

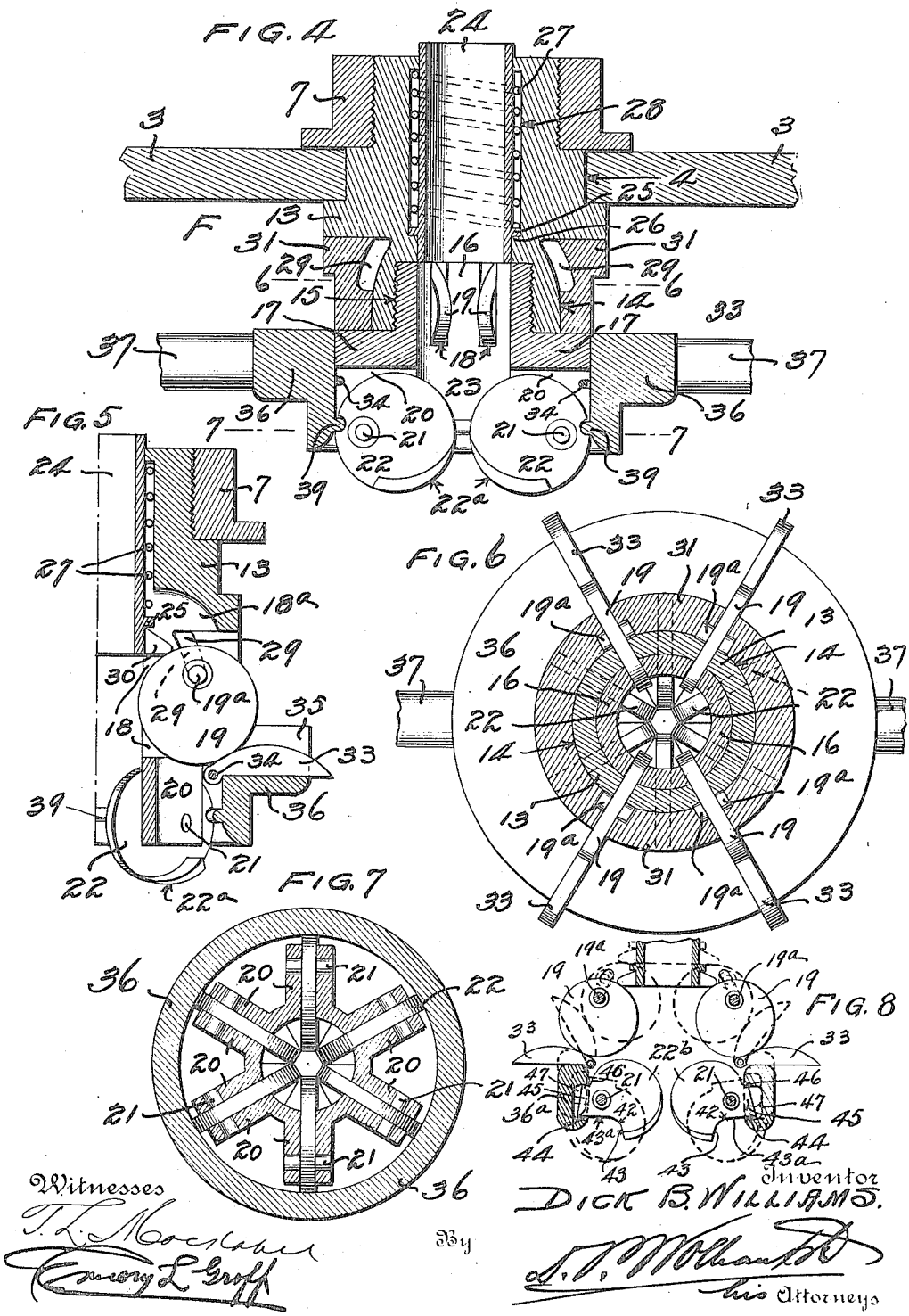

UNITED STATES PATENT OFFICE.

DICK B. WILLIAMS, OF NEW ORLEANS, LOUISIANA, ASSIGNOR TO LOUISIANA NUT & PRODUCE COMPANY, OF NEW ORLEANS, LOUISIANA, A CORPORATION OF LOUISIANA.

SEGREGATING-FEEDER FOR NUT-CRACKING MACHINES.

1,187,878.          Specification of Letters Patent.      Patented June 20, 1916.

Application filed October 19, 1914. Serial No. 867,447.

*To all whom it may concern:*

Be it known that I, DICK B. WILLIAMS, a citizen of the United States, residing at New Orleans, in the parish of Orleans and State of Louisiana, have invented certain new and useful Improvements in Segregating-Feeders for Nut-Cracking Machines, of which the following is a specification.

This invention relates to the subject of nut cracking machines, and has particular reference to an improved feeder device possessing special utility in its application to the type of nut cracking machines disclosed in my pending application for patent Serial No. 837,481, filed May 9, 1914.

The primary object of the invention is to provide a novel and practical segregating feeder which will positively and reliably feed the nuts singly into the cracking zone, and to effectually prevent more than one nut at a time from moving into position for cracking while at the same time keeping the machine clear and free from choking. To accomplish this result, the invention proposes to utilize certain novel instrumentalities which permit one nut to be delivered to the cracking means, and simultaneously actuating means for intercepting the next succeeding nut to prevent its being delivered into the cracking zone until the proper time. This action not only aids in securing a maximum output for the machine, but also prevents overfeeding, and insures each nut individually obtaining the full benefit of the cracking operation.

A further object of the invention is to provide a device of the character described that is simple in its construction and reliable in its operation, and also provides for the automatic adjustment of certain of its parts which will enable it to meet the requirements of all commercial grades of nuts that are fed through the machine.

With the above and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which—

Figure 1 is a vertical sectional view of a portion of a nut cracking machine having the present invention applied thereto. Fig. 2 is a diagrammatic view showing the delivery disks of the feeder closed and the check disks open. Fig. 3 is a view similar to Fig. 2 showing the upper or check disks obstructing the mouth of the passageway from the hopper, and the lower or delivery disks open to deliver a nut into the cracking zone. Fig. 4 is a vertical sectional view of my improved feeding and segregating device, the line of section being through the plane of a pair of the delivery disks. Fig. 5 is a detail vertical sectional view on a line of section through one of the upper check disks. Fig. 6 is a transverse section on the line 6—6 of Fig. 4. Fig. 7 is a transverse sectional view on the line 7—7 of Fig. 4. Fig. 8 is a diagrammatic view similar to Figs. 2 and 3, illustrating a modified form of the interlocking connection between the delivery disks and the closing collar, and showing the closed position of the segregating device in full lines with the open position in dotted lines.

Similar reference characters designate corresponding parts in the several figures of the drawings.

One of the practical features of the invention is that it may be applied with facility to the type of machine disclosed in my aforesaid pending application without any changes or alterations being necessary in the framework or other parts of the machine. The advantages resulting from this do not end with the mere facility of application and consequent economy, but involve other substantial results as pointed out in the foregoing statement and following specification.

Referring particularly to the details of construction of the embodiment shown in the several figures of the drawings, it will be observed that the reference numeral 1 designates the lower frame bar of the machine which supports a substantially rectangular frame portion 2 having the upper frame bar 3 whose central portion is provided with an opening 4 to accommodate and receive the feeding and segregating device designated in its entirety by the reference letter F. The feeder head 6 is preferably secured to and suspended from the upper frame bar 3 by means of a suitable threaded collar 7 whose upper portion provides a journal bearing for an operating wheel 8 having a hub portion which forms a rotary supporting sleeve 9 to which is fitted a flaring revoluble supply hopper 10 having arranged therein a suitable agitator 11. The said feeder head 6 is stationary and essentially comprises a body portion 13 whose base is reduced to form a substantially semi-spherical or rounded surface 14, and is interiorly threaded at its lower end as at 15 to receive the threaded neck 16 of an outlet section 17. The said neck 16 is provided therein with a plurality of longitudinally disposed or vertical slots 18 which correspond to similar and slightly larger clearance slots 18ª in the rounded base portion of the body of the feeder head to provide working space for the check disks 19 which will hereinafter be more fully referred to. The lower portion of the outlet section 17 is formed with a plurality of radially extending disk supporting members 20 between which are eccentrically mounted, upon the pivots 21, a plurality or circular group of delivery disks 22 adapted to turn on their pivots to open and close the mouth of the passageway 23 of the outlet section. This passageway communicates with a guiding tube 24 arranged in the bore of the stationary feeder head, and opens at its upper end into the supply hopper 10, thus providing a continuous passageway through which nuts may pass from the feed hopper into the cracking zone, subject of course to being intercepted and segregated by the action of the disks 19 and 22. In this connection, it will be observed that the delivery disks provide what may be termed an automatic gate operating to feed the nuts singly, and in its closed position acting as an anvil which coöperates with the compressing member arranged in opposition thereto. The check disks also in effect constitute what may be termed an intercepting gate which is disposed at one side of or in juxtaposition to the delivery gate made up of the disks 22 and acts to pass the nuts singly to the said delivery gate.

In connection with the guiding tube 24, it will be observed from Fig. 4 that the same is provided with an abutment flange 25, one side of which rests against the shoulder 26 of the feeder head when the parts are in their normal position while the opposite side is engaged by a coiled spring 27 confined within the bore 28 of the feeder head, and having a tendency to maintain the guide tube in said normal position, and at the same time maintain the check disks 19 also in their normal positions. That is to say, the check disks 19 whose eccentric pivots 19ª are mounted in the inwardly inclined adjustment slots 29 are normally held at the bottom of these slots by means of the presser lugs 30 carried by the lower end of said guide tube 24.

The slots 29 which are inclined toward the axis of the passageway of the guide tube 24 are partly formed by cutaway portions or grooves in a sectional ring comprising a plurality of holding plates 31 which are clamped to the body of the feeder head over the rounded surface 14 (forming a part of said slots) by means of suitable fastening elements such as the screws 32 (Fig. 1). The provision of these adjustment slots 29 is of practical importance to the operation of the device, inasmuch as they not only provide a guide housing for the pivots 19ª of the check disks, but they also permit an upward and inward movement of said disks which tends to bring the peripheries of opposite disks in closer relation to effect a complete cut - off of the passage of a nut from the tube 24 onto the delivery disks whereon it is temporarily checked while the preceding nut is being cracked.

Directly beneath each of the check disks 19, and in peripheral contact therewith, is a cam lifting-finger 33 which is pivoted, as at 34, in the walls 20 of the radially extending disk supporting members. These cam lifting fingers 33 normally lie in notches 35 of a vertically reciprocating closing device or collar 36 which slidably embraces the outlet section of the feeder head and also the adjacent portions of the latter. This vertically reciprocating closing collar 36 carries oppositely extending operating arms 37, the extreme outer ends of which are in contact with the peripheries of the controlling lifting cams 38 of the nut cracking machine, as can best be observed by reference to Fig. 1. The inner face of the cylindrical body portion of the closing collar is formed with a catch projection 39 which engages with notches 40 on the delivery disks 22, so that when the closing device is in its lower or normal position, the check disks 22 are caused to assume the position shown in Fig. 4, and when the closing device is raised, the catch projection 39 will positively force the check disks to turn about their pivots 21 and thereby open the same, as can be best observed from the diagram of Fig. 3.

The construction described provides for a positive movement of the delivery disks upon the movement of the closing device, and does not depend upon the said disks opening by gravity, thereby eliminating the possibility of their being inoperative from being clogged with particles from the cracking operation or otherwise. It is apparent that the closing device performs a dual function, namely that of turning the delivery disks 22 upon the pivots 21, and also, in its upward movement pushing the cam lifting fingers 33 upwardly, so that the latter in turn cause the check disks 19 to rotate on their pivots 19ª, and if the nut is of unusual length also causing the said check disks to be directed upwardly and inwardly by the pivots 19ª riding in the inwardly inclined adjustment slots, thus effectively checking the feeding of other nuts from the hopper.

From the foregoing description, it is believed that the mechanical details will be readily apparent, and in connection with the operation of the device, it will be observed that the agitating device 11 in the hopper 10 will direct nuts in single file into the guide tube 24, whence they fall downwardly through the tube. Assuming that the reciprocating closing collar 36 is in its normal or lower position, as shown in Fig. 2, the delivery disks 22 will be closed so that their anvil portions 22ª provide a seat for one end of the nut A in the cracking zone, while the nut B which has been fed down from the hopper is resting upon the top of said delivery disks 22 in the check zone, and the check disks 19 are idly disposed in the lower ends of the slots 18 and do not obstruct the passage of nuts. However, when the closing collar 36 is raised, as shown in Fig. 3, the cam lifting fingers 33, which are in contact with the check disks 19, are swung upwardly and inwardly on their fixed pivots 34 so that the check disks 19 will turn inwardly upon their pivots 19ª, and also will rise and in so doing lift the tube 24 against the tension of the light spring 27. At the time this action takes place, the delivery disks 22 are turned outwardly on their pivots 21 so that the nut B is delivered into the cracking zone and onto the anvil 41 of the machine. That is to say, the upward movement of the closing collar 36 causes the check disks 19 to intercept and hold back the nut C in the tube while the nut B is being delivered onto the anvil 41, thereby making it impossible for more than one nut at a time to be handled by the delivery disks 22 and the cracking mechanism. If the pecan is of the ordinary length, the mere turning inwardly of the check disks upon their pivots 19ª will be sufficient to check the advance of the nut C, or others in a similar position. However, should the nut be of unusual length, the check disks can ride upwardly in their guiding and holding slots to thereby effectively obstruct the passageway.

It will now be observed that the spring pressed tube 24 while acting as a guiding tube for holding the fed nuts in single file, at the same time is so mounted in connection with the light spring 27 as to not interfere at all with the closing action of the check disks 19 for all sizes of nuts. Furthermore when the closing collar 36 lowers and thereby relieves the check disks 19 from the pressure of the cam fingers 33, the said check disks are permitted to swing downwardly and outwardly by gravity, which movement, however, is accelerated so as to be quickly performed through the assisting action of the spring 27 which holds the lugs 30 normally in contact with the peripheries of said disks.

While under ordinary conditions, the force of gravity may be partly or wholly relied upon to provide for opening the delivery disks to a sufficient extent for the passage of a nut, yet under extreme conditions this force may be not entirely sufficient for that purpose, so in order to provide a movement for the delivery disks that will meet all conditions normal and extreme, it may be found desirable to provide a form of interlocking connection between the disks and the closing collar that will provide a positive mechanically operated movement for the disks in both opening and closing. A modification of this character is illustrated in Fig. 8 of the drawings, and referring thereto it will be observed that the delivery disks 22ᵇ shown therein are of irregular contour having a collar clearance notch 42, one wall 43 of which is disposed at an angle to the other wall 43ª to provide abutments for the collar 36ª. The wall 43ª forms a shoulder 44 at one edge of the peripheral tenon 45 whose opposite side edge 46 also provides a shoulder which engages with the side wall of an annular groove 47 in the closing collar. It will thus be apparent that the disks 22ᵇ have an interlocking connection with the closing device in such a manner that any vertical movement of the latter in either an upward or downward direction will positively turn the disks 22ᵇ on their pivots 21. When the delivery disks are closed as shown in full lines in Fig. 8, they are held in this position by the upper edge of the groove 47 bearing against the shoulder 46 of the disk, and when the closing collar 36ª is moved upwardly as shown by dotted lines, this shoulder 46 is released and the lower edge of the groove 47 exerts an upward pull against the stop shoulder 44 of the disk, thus imparting a turning motion thereto and not depending alone on gravity for the disk to assume its lower dotted line position. It is in this position that the clearance notch 42 becomes effective. That is to say, when the collar 36ᵃ is in its upper dotted line position, and the delivery disks 22ᵇ are in their lower dotted line position in the act of delivering a nut to the cracking zone, the clearance notch 42 permits each disk to assume such a position that its abutment wall 43 is directly beneath the lower edge of the closing collar. With the delivery disks and the collar in this relation, it will be apparent that upon downward movement of the latter, the delivery disks will be turned back toward their normal closed position, because of the closing device bearing against the abutment wall 43 of the clearance notch. The continued downward movement of the collar 36ᵃ again brings the stop shoulder 46 into engagement with the upper side wall of the groove 47, so that the holding of the delivery disks in their closed position depends upon the pressure of the closing collar being upon the shoulder 46. Therefore, it will be apparent that the present construction provides for positively actuating the delivery disks so that their opening and closing will not depend upon gravity.

The particular construction and arrangement of the check and delivery disks provides a most effective segregating action which accurately feeds and delivers the nuts into the cracking zone in proper sequence. The segregating principle as embodied in the present device permits the working parts to immediately adjust themselves promptly and accurately to any variation in diameter or length of pecans fed through the machine, thereby making a thoroughly practical and reliable feeder device which materially increases the efficiency and out-put of the entire machine.

In connection with the delivery disks, it will be noted that the same are usually six in number so that when they are closed, their anvil portions will furnish a firm and rigid seat for one end of the nut to be cracked. The check disks may be of a less number, as they only have a checking or intercepting function, while the lower disks both deliver the nut from the check zone to the cracking zone, and also form one of the cracking anvils.

Since no claim is made herein to the specific means for operating the anvil 41 and its associated parts, detailed reference to said operating means is omitted, and it will be understood that while the various details of construction involved in the mounting of the various elements constituting the present invention have been described herein with particularity, modifications therein and also in the form, proportion, and minor details of construction may be restored to without sacrificing any of the advantages of the invention, or departing from the scope of the appended claims.

I claim:

1. A nut feeding device of the class described including an automatic delivery gate operating to feed nuts singly and adapted, in one position, to form an anvil, and a check device operating automatically in advance of said gate to intercept the nut following the nut feeding through the gate.

2. A feeder for nut cracking machines including an automatically operating delivery gate which forms an anvil in its closed position, and an automatic nut intercepter operating in advance of the gate and coöperating therewith to feed nuts singly.

3. A feeder for nut cracking machines including in combination with compressing means, an automatically operating delivery gate which forms an anvil in its closed position, and an automatic self-adjusting intercepter operating at one side of the gate.

4. A feeder for nut cracking machines including, in combination with compressing means, an automatically operating delivery gate for feeding the nuts singly and adapted in one position, to form a compression member, and an automatic check device disposed above the delivery gate and consisting of a nut intercepting gate operating to pass nuts singly to the delivery gate.

5. A feeder for nut cracking machines including, in combination with compressing means, a delivery gate which forms an anvil in its closed position, a nut intercepting gate arranged in juxtaposition to the delivery gate, and means for simultaneously operating the separate gates.

6. A feeder for nut cracking machines including, in combination with compressing means, a delivery gate which forms an anvil in its closed position, a nut intercepting gate arranged in juxtaposition to the delivery gate, and means for simultaneously closing one gate and opening the other, and vice versa.

7. A feeder for nut cracking machines including, in combination with a compressing means, a delivery gate which forms an anvil in its closed position, a nut intercepting gate arranged at one side of the delivery gate and self-adjustable to nuts of varying length, and means for simultaneously operating the separate gates.

8. A feeder for nut cracking machines including, in combination with compressing means, delivery gate which forms an anvil in its closed position, a nut intercepting gate arranged above the delivery gate and automatically adaptable in a vertical direction to nuts of varying length, and means for simultaneously closing one gate and opening the other, and vice versa.

9. A feeder for nut cracking machines including, in combination with compressing means, a delivery gate consisting of a plurality of automatically operated pivoted elements adapted to occupy a closed relation to form an anvil, and an automatically operating check device consisting of a plurality of pivoted elements adapted to occupy a closed relation when the delivery gate is open and vice versa.

10. A feeder for nut cracking machines including, in combination with compressing means, a delivery gate consisting of a circular group of radially arranged pivoted disks, a check device at one side of said gate also consisting of a circular group of radially arranged pivoted disks, and means for simultaneously operating both groups of disks.

11. A feeder for nut cracking machines including, in combination with compressing means, a delivery gate consisting of a circular group of pivoted disks adapted to occupy a closed relation to form an anvil, a check device at one side of said gate also consisting of a circular group of pivoted disks, and means for simultaneously closing one set of disks and opening the other, and vice versa.

12. A feeder for nut cracking machines including, in combination with compressing means, a delivery gate consisting of a plurality of eccentrically pivoted disks, a check device at one side of said gate also consisting of a plurality of eccentrically pivoted disks, and means for automatically opening and closing the disks of both sets.

13. A feeder for nut cracking machines including, in combination with compressing means, a delivery gate consisting of a plurality of eccentrically pivoted disks, a check device at one side of said gate also consisting of a plurality of eccentrically pivoted disks, the disks of said check device having a loose play in one direction, and means for automatically opening and closing the disks of both sets.

14. A feeder for nut cracking machines, including in combination with compressing means, a feeder head having a passageway, automatically adjustable check means for controlling the passage of nuts from the outlet of said passageway, delivery means arranged beneath said check means, and means for causing said check and delivery means to alternately open and close, and said delivery means when closed operating as an anvil.

15. A feeder for nut cracking machines, including in combination with compressing means, a feeder head having a passageway, eccentrically pivoted check means for controlling the outlet of said passageway and automatically adjustable toward the axis of said passageway, eccentrically pivoted delivery means arranged beneath said check means, and vertically reciprocating means for causing the check and delivery means to open and close.

16. A feeder for nut cracking machines, including in combination with compressing means, a feeder head having a passageway, check means pivoted in said feeder head and having a compound movement for self adjustment purposes, delivery means arranged beneath said check means, check operating means also carried by the feeder head, and a closing device for actuating said check operating means and having an operative engagement with the delivery means.

17. A feeder for nut cracking machines, including in combination with compressing means, a feeder head having a passageway and a plurality of inclined slots, check disks mounted eccentrically on pivots working in said slots, a plurality of cam-fingers pivotally mounted on the feeder head and having their cam faces bearing against said check disks, delivery disks having pivots mounted in a fixed location on the outlet portion of the feeder head, and means for simultaneously operating said cam-fingers and delivery disks.

18. A feeder for nut cracking machines, including in combination with compressing means, a feeder head having a passageway and a plurality of inclined slots, a spring-seated guide tube arranged in the passageway of the feeder head and having presser lugs bearing against said check disks to return them to normal position, a plurality of cam-fingers pivotally mounted in the feeder head and having their cam faces bearing against said check disks, delivery disks having eccentric pivots mounted in a fixed location on the outlet portion of the feeder head, and means for operating said cam fingers and delivery disks.

19. A feeder for nut cracking machines, including in combination with compressing means, a stationary feeder head having a passageway and a plurality of slots inclined toward the axis of said passageway, an outlet section having pivot supporting members, check disks having pivots movably mounted in the said slots, said check disks projecting into the passageway, delivery disks eccentrically mounted on pivots having a fixed location in the outlet section, and a reciprocating closing device for actuating said check and delivery disk.

20. A feeder for nut cracking machines, including in combination with compressing means, a feeder head having a central bore, a spring-pressed guide tube arranged within said bore, an outlet section having a neck portion communicating with said guide tube, check disks eccentrically pivoted in the feeder head and automatically adjustable toward the axis of the bore therein against the spring pressed guide tube, delivery disks eccentrically pivoted in the outlet section, and reciprocating means for alternately opening and closing the said check and delivery disks.

21. A feeder for nut cracking machines, including in combination with compressing means, a feeder head having a central bore and a rounded portion at its lower end, a spring-pressed guide tube arranged within said bore, an outlet section fitted to the lower end of the feeder head, a sectional ring consisting of holding plates having grooves and secured to the rounded portions of the feeder head to form and inclose inwardly inclined slots, check disks having pivots mounted in said slots, delivery disks mounted in the outlet section, and means for actuating said check and delivery disks.

In testimony whereof I hereunto affix my signature in the presence of two witnesses.

DICK B. WILLIAMS.

Witnesses:
J. M. KAISER,
E. B. ELLIS.